United States Patent
Henriksen et al.

(10) Patent No.: US 8,045,280 B2
(45) Date of Patent: Oct. 25, 2011

(54) COMPACT ADJUSTABLE LENS

(75) Inventors: Lars Henriksen, Tønsberg (NO); Morten Eliassen, Sandefjord (NO); Vladimir Kartashov, Horten (NO); Jon Herman Ulvensøen, Åsgårdstrand (NO); Ib-Rune Johansen, Oslo (NO); Karl Henrik Haugholt, Oslo (NO); Dag Torstein Wang, Oslo (NO); Frode Tyholdt, Oslo (NO); Wilfred Booij, Nordby (NO)

(73) Assignee: poLight AS (NO)

( * ) Notice: Subject to any disclaimer, the term of this patent is extended or adjusted under 35 U.S.C. 154(b) by 0 days.

(21) Appl. No.: 12/445,272

(22) PCT Filed: Oct. 5, 2007

(86) PCT No.: PCT/NO2007/000350
§ 371 (c)(1), (2), (4) Date: Dec. 22, 2009

(87) PCT Pub. No.: WO2008/044937
PCT Pub. Date: Apr. 17, 2008

(65) Prior Publication Data
US 2010/0091389 A1    Apr. 15, 2010

(30) Foreign Application Priority Data

Oct. 11, 2006 (NO) ................... 20064625
Nov. 14, 2006 (NO) ................... 20065237

(51) Int. Cl.
*G02B 7/02* (2006.01)

(52) U.S. Cl. .................. 359/811; 359/666
(58) Field of Classification Search .......... 359/811
See application file for complete search history.

(56) References Cited

U.S. PATENT DOCUMENTS

| 5,886,332 | A | 3/1999 | Plesko |
| 6,188,526 | B1 | 2/2001 | Sasaya et al. |
| 2002/0048096 | A1 | 4/2002 | Melzer et al. |
| 2002/0149864 | A1 | 10/2002 | Kaneko |
| 2004/0008419 | A1 | 1/2004 | Schachar |
| 2005/0036195 | A1 | 2/2005 | Nishioka |
| 2005/0133789 | A1 | 6/2005 | Oh et al. |
| 2006/0028734 | A1 | 2/2006 | Kuiper et al. |
| 2006/0133789 | A1 | 6/2006 | Yu |
| 2006/0139585 | A1 | 6/2006 | Maria Van Der Wijst |
| 2007/0211349 | A1 | 9/2007 | Chen |
| 2007/0263293 | A1* | 11/2007 | Batchko et al. ............... 359/666 |

(Continued)

FOREIGN PATENT DOCUMENTS
CN    2706779    6/2005
(Continued)

OTHER PUBLICATIONS

Chinese Office Action, dated Mar. 18, 2010 from CN Appl. 200780034604.6 filed Sep. 21, 2007.

(Continued)

*Primary Examiner* — Ricky Mack
*Assistant Examiner* — James Jones
(74) *Attorney, Agent, or Firm* — Knobbe Martens Olson & Bear LLP (57) ABSTRACT

The present invention provides a solution for designing a compact adjustable lens assembly, wherein a circular shaped piezoelectric crystal is bending a thin glass cover, thereby providing a shift of focal length of the lens assembly.

6 Claims, 8 Drawing Sheets

U.S. PATENT DOCUMENTS

2007/0299487 A1 * 12/2007 Shadduck .................. 607/89
2008/0277480 A1    11/2008 Thuries

FOREIGN PATENT DOCUMENTS

| | | |
|---|---|---|
| DE | 3644225 | 7/1987 |
| GB | 2163864 | 3/1986 |
| JP | 62151824 | 7/1987 |
| JP | 01140118 A | 6/1989 |
| JP | 02178602 A | 7/1990 |
| JP | 1062609 | 3/1998 |
| JP | 11133210 A | 5/1999 |
| JP | 200081503 | 3/2000 |
| JP | 2000249813 A | 9/2000 |
| JP | 2001257932 | 9/2001 |
| JP | 2002243918 | 8/2002 |
| JP | 2002239769 | 8/2008 |
| NO | 20064271 | 9/2006 |
| WO | WO 2004/038480 | 5/2004 |
| WO | WO 2004059364 | 7/2004 |
| WO | WO 2005085930 | 9/2005 |
| WO | WO 2007017089 | 2/2007 |
| WO | WO 2008035983 | 3/2008 |
| WO | WO 2008035984 | 3/2008 |
| WO | WO 2008044938 | 4/2008 |
| WO | WO 2008 100154 | 8/2008 |
| WO | WO 2010 005315 | 1/2010 |

OTHER PUBLICATIONS

Extended EP Search Report dated Aug. 9, 2010 in EP application EP 08712671, filed Feb. 12, 2008.

* cited by examiner

COMPACT ADJUSTABLE LENS

CROSS REFERENCE TO RELATED APPLICATIONS

This application claims the benefit and priority to and is a U.S. National Phase of PCT International Application Number PCT/NO2007/000350, filed on Oct. 5, 2007. This application claims the benefit and priority to Norwegian Application No. NO 20064625, filed on Oct. 11, 2006 and Norwegian Application No. NO 20065237, filed on Nov. 14, 2006. The disclosures of the above-referenced applications are hereby expressly incorporated by reference in their entirety.

BACKGROUND OF THE INVENTION

1. Field of the Invention

The present invention is related to design of adjustable lenses, and especially to a design of a lens comprising a gel or elastomer disposed on bendable glass, wherein a piezo electric element is arranged in contact with the glass providing a bending of the glass when voltage is applied on the piezo electric element providing adjustment of lens parameters.

2. Description of the Related Art

There is an increasing demand for low cost, high volume solutions for adjustable lens elements in an ever increasing number of applications. The popular use of cameras in mobile phones represents an amount of millions of lenses. The design of such lenses requires fulfillment of a plurality of requirements, such as ease of operation when fitting the lens on top of a camera module in the mobile phone, providing as few operational steps as possible, etc. These challenges are even greater when the lens arrangement comprises tuneable parameters, such as encountered in auto focus lenses, wherein the focal length must be adjusted to fit the distance from the lens to the object to be photographed, for example. Such lenses are usually complex designs comprising movable parts, for example, which can make it difficult to assemble the lens in a reasonable manner. A further challenge with such designs are the ever increasing requirement to provide as thin lens assemblies as possible. Thin and lightweight mobile phones and cameras is a must in the marketplace.

Figure 1:
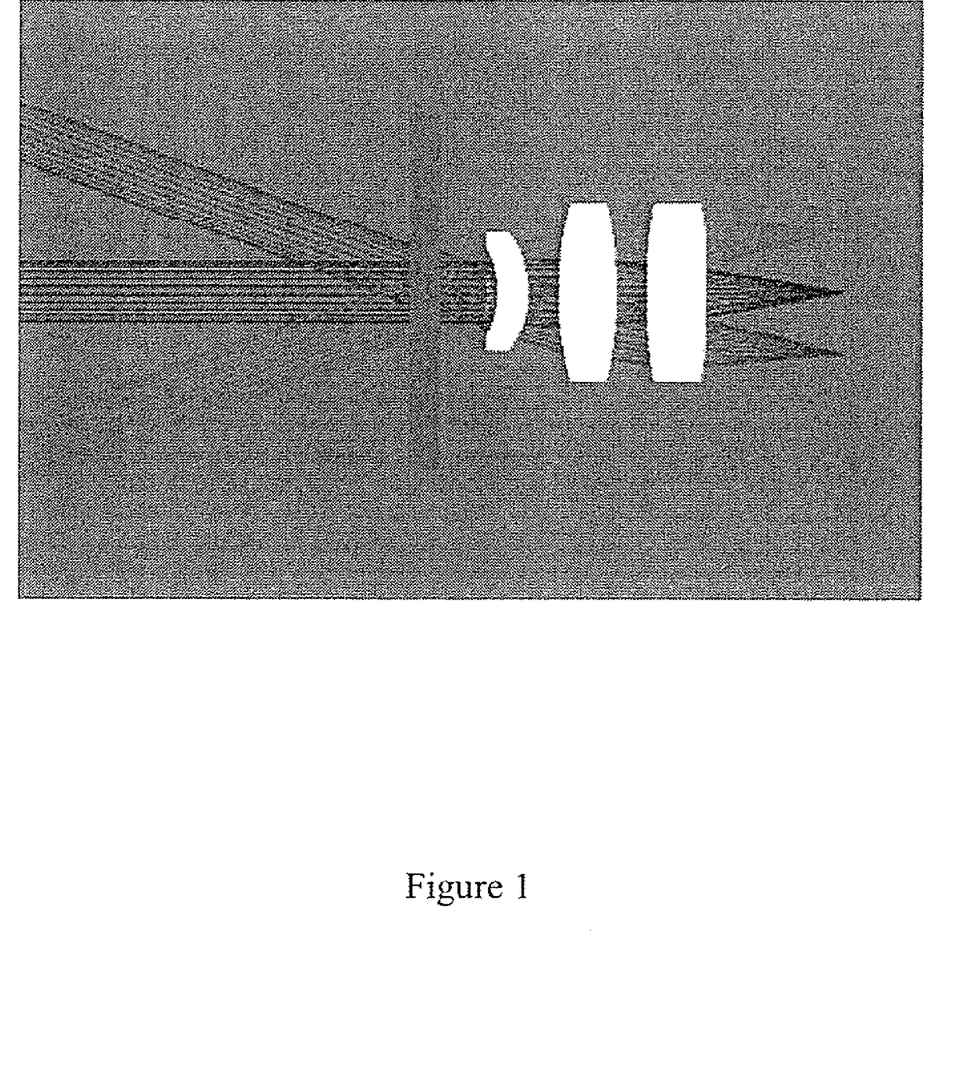
FIG. 1 illustrates schematically the principle of a stack of lenses in a camera module.

Usually, it is necessary to have a stack of lenses atop an image sensor (a CMOS or CCD sensor), in order to focus light from the object to be photographed down to the sensor. A schematic illustration of a lens stack is illustrated in FIG. 1. By proper design of the total lens stack, the focus lens (rectangular in the schematic) can be located either closest to the photographing object or in between other lens elements. The role of the focus lens element is to shift focal point continuously from infinity to a minimum focal distance, which is determined by the application of the camera, for example. Focal distances may be in the range of 5-50 cm, for example.

In prior art there are some examples of compact adjustable lens designs. For example, in the article "Design, fabrication and testing of a micro machines integrated tuneable micro lens", by Weisong et. Al., Journal of Micromechanics and Microengineering, 9 May, 2006, disclose a lens assembly wherein a liquid in a cavity may be compressed or elongated to achieve an adjustment of focal length of the lens. However, mass production comprising filling liquid may be a difficult and time consuming task.

JP 02-178602 disclose a lens assembly wherein a couple of transparent base materials with a liquid in between provides a bending of the base materials by applying a voltage on piezo electric elements disposed on one of the base materials, wherein the bending provides a desired curvature of the surfaces of the lens assembly.

JP 2000-249813 disclose a lens assembly comprising a deformable transparent material disposed in between two bendable transparent plates. A common actuator can bend the plates to provide a shift of the focal length of the lens assembly.

JP 01-140118 disclose an adjustable lens assembly comprising a piezo electric polymer with transparent electrodes on top of a cylinder container comprising a transparent liquid. Voltages applied onto the piezo electric polymer provides a curvature of the polymer, and hence a shift of focal length.

Therefore there is a need for a lens design providing simple adjustment of the lens, wherein the lens assembly is easy and cheap to mass produce.

SUMMARY OF THE INVENTION

According to an aspect of the present invention, a lens assembly comprising at least one support supporting a gel or elastomer comprising a thin glass cover, wherein a circular shaped middle part of the thin glass cover is arranged as an island with no contact to the rest of the glass cover, floating on top of the gel, wherein a thin circular piezo electric ring shaped crystal is disposed in contact with the edge of the glass island, the rest of the glass cover is disposed on top of the gel until the edges of the at least one support, wherein spacer elements along the edge of the at least one support provides electric connections for signals applied on the piezoelectric ring, and wherein the spacer elements at the same time provides mechanical support and fixation of the glass cover to the at least one support.

In an example of embodiment of the present invention, via holes in electric contact with the spacer elements provides pads for connecting the lens assembly electrically to the top of a camera assembly.

According to another example of embodiment of the present invention, a design of an adjustable optical lens provides a lens wherein the total size of the lens including electrical contacting is small enough to be implemented in a stack of other optical elements, and is not exceeding the size of the other elements in the stack.

According to another example of embodiment of the invention spacer members also acts as a spacer element during manufacturing of the lens.

DETAILED DESCRIPTION OF THE PREFERRED EMBODIMENT

Digital camera modules comprises, for example:
- an image sensor (CCD or CMOS sensor)
- colour filters, with micro lens arrays
- lens stack for focusing light from photographing object down to the sensor if auto focus or zoom functionality is to be included, a tuneable lens element must be included somewhere in the lens system Any tuneable functionality in an optical system (auto focus, zoom) must per se include some adjustable lens element or parameter. Focal properties can be adjusted for example by physically moving lenses relative to each other, or by deforming the physical shape of a lens. It will be obvious that an adjustable lens element that contains no moving parts will have the potential of being both more reliable and more cost efficient during manufacturing. The development of deformable lenses has been a topic of high interest. And with the introduction of digital camera solutions into high volume consumer products, such as compact cameras, mobile phones and PCs, the demand for higher quality, lower cost camera module systems has increased. Adding features like zoom and auto focus functionalities will give added value to the camera solutions in such applications.

According to another aspect of the present invention, other tuneable parameters may be of interest when the lens system is used in a light measuring device or instrument based on light properties. Any adjustable lens parameter related to the application of the lens assembly according to the present invention, is regarded as being inside the scope of the present invention.

As known to a person skilled in the art, wafer production is one of the most effective manners to achieve mass production of micro electronics and micromechanical components. One of the challenges that arises when compactness and low cost is requirements, it is necessary to implement wafer scale processing throughout the whole production cycle. For certain applications of adjustable lens elements, it is highly desirable also to implement adjustable lenses in a stack with other lenses and/or other optical elements, such as optical sensors etc. on a wafer scale production. This can be feasible if the lateral size of the lens element do not exceed the size of the other elements in the wafer stack. None of the prior art techniques can combine low cost with the possibility to implement adjustable lenses on a wafer scale manufacturing of for example compact digital camera modules for implementation into mobile phones, cameras, pc's etc.

Figure 2:
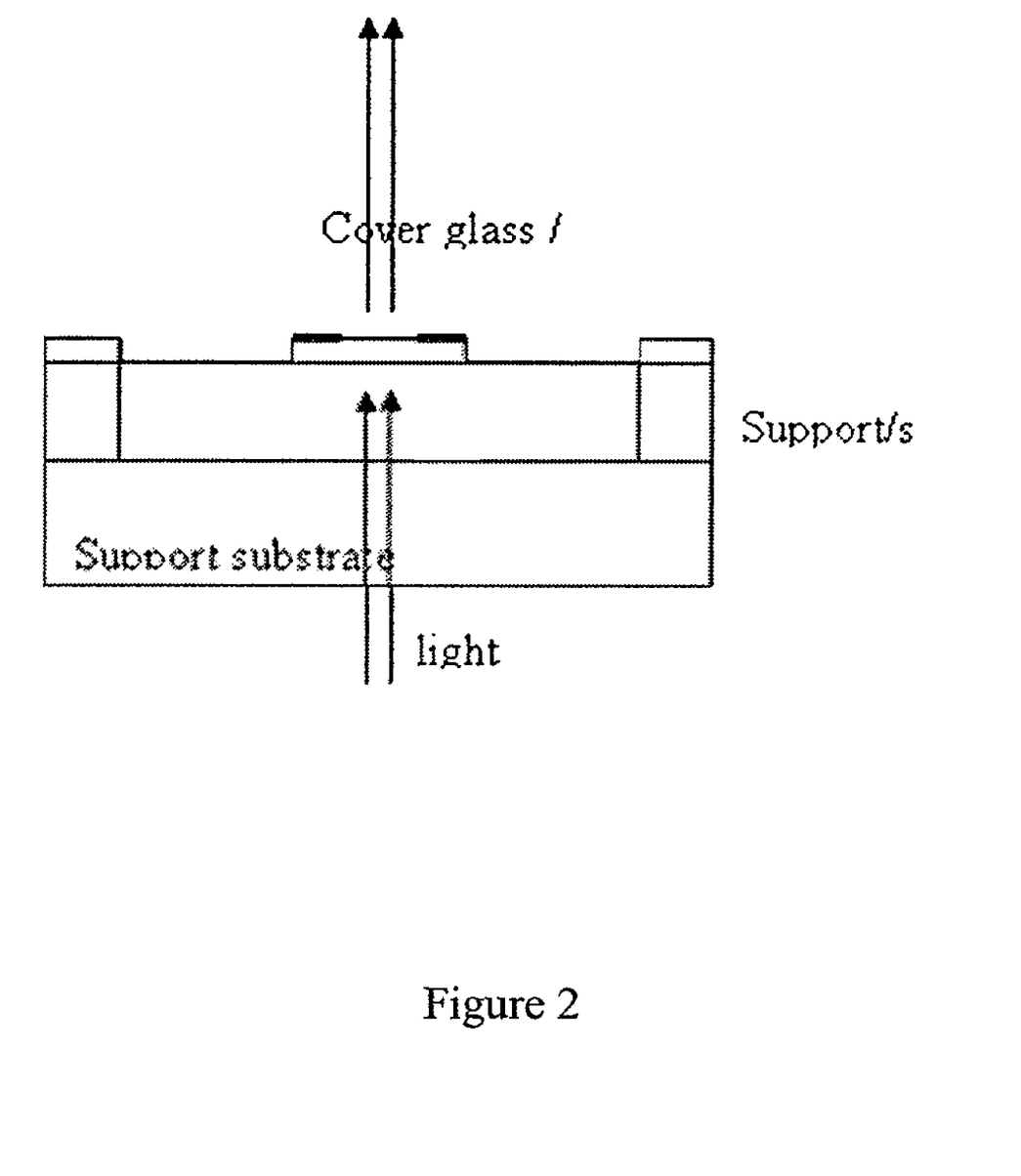
FIG. 2 depicts the design principle of a lens assembly according to the present invention.
Figure 3:
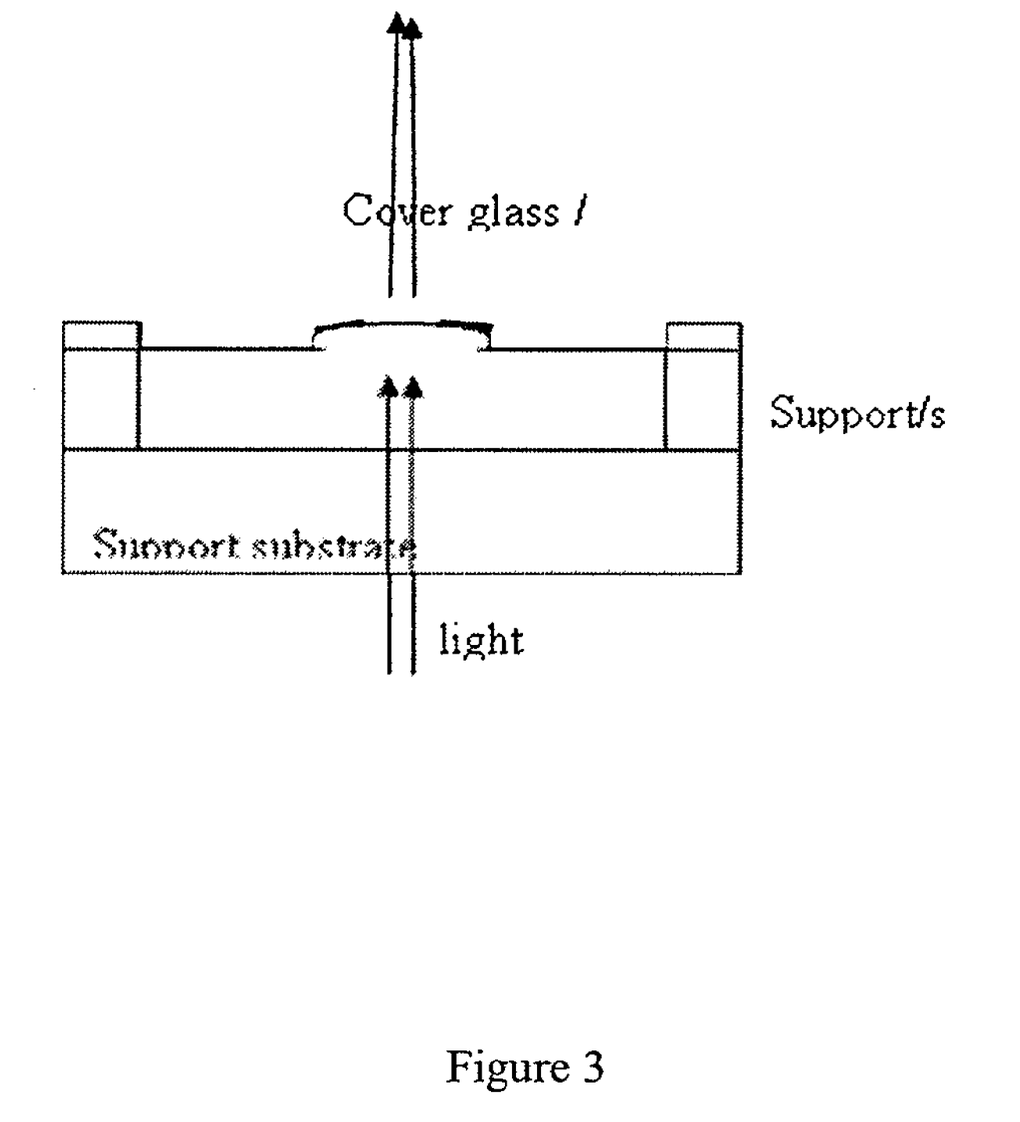
FIG. 3 depicts another view of the design principle of a lens assembly according to the present invention.
Figure 4:
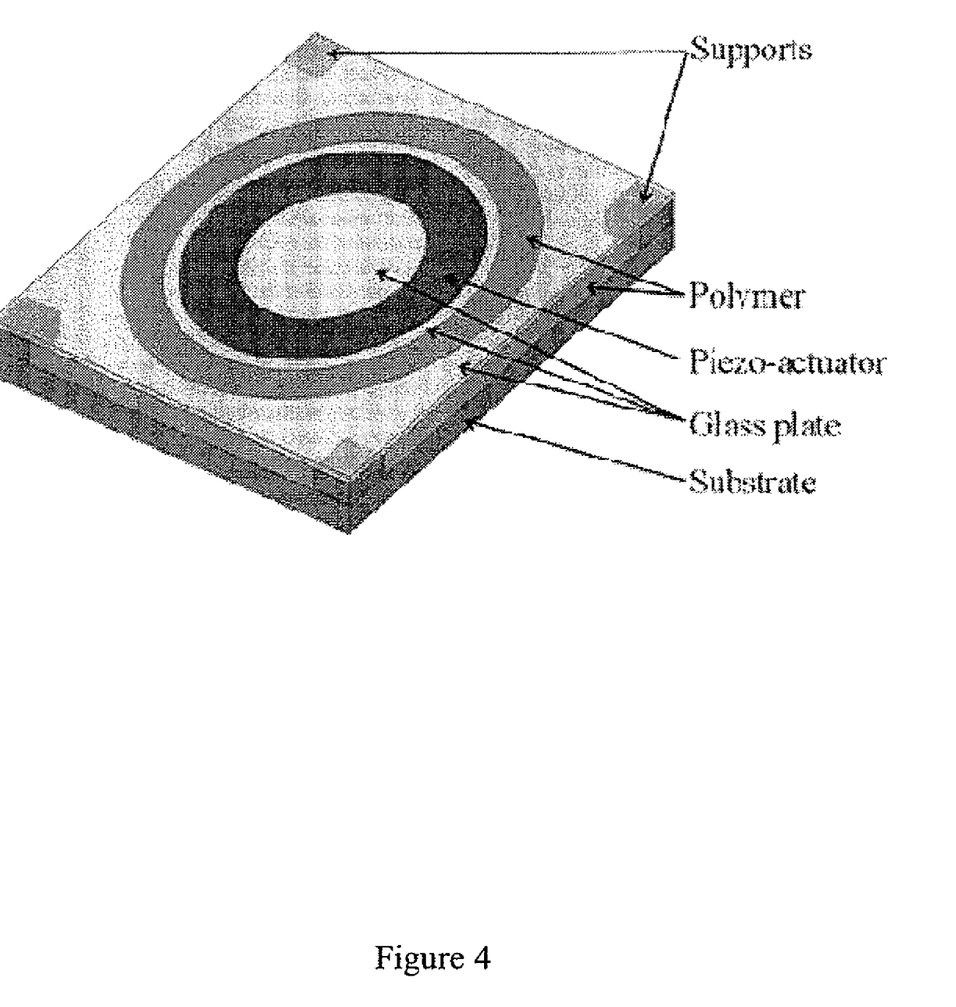
FIG. 4 depicts a perspective view of the lens design illustrated in FIGS. 2 and 3.

There exists a number of technologically feasible solutions for making compact adjustable lenses, for use in applications such as (auto) focus lenses or zoom lenses. This invention relates to a design of an adjustable lens that consists of a stack of materials as depicted in FIGS. 2, 3 and 4. The bottom substrate is a support element, made of any transparent, relatively rigid material, such as any glass or transparent polymeric material. The top element is another relatively rigid material, including an actuating element, such as a piezoelectric element. Sandwiched between these is a deformable, transparent material, such as a polymer gel or elastomer, or a branched or linear polymer or oily liquid. The basic principle of the actuation that defines the adjustable lens is the direct deformation of the actuator/cover material that creates a curvature. The curvature radius defines the focusing properties of the lens, as known to a person skilled in the art.

The present invention is relates to the above disclosed design, wherein the total lens assembly also includes at least one support element that act as spacers during manufacture, in order to provide the necessary thickness of the sandwiched flexible material, and as a stabilizing element, that provides increased mechanical stability of the whole adjustable lens assembly.

The functionality of the adjustable lens lies in the disk that is bendable. The bendable disk therefore has to be relatively unattached; it must be floating atop the deformable (polymer) material. By introducing the stabilizing support elements, as depicted in FIGS. 2 and 3, the following advantages are evident:

The stabilizing elements give increased mechanical stability of the whole lens assembly, which is important both for the handling of wafers during manufacturing and assembly with other wafers (for example lens stacks and image sensors) and during singulation (sawing) of the wafer stack into individual camera modules, and during further integration of the camera modules into their intended application (mobile phones, digital cameras, PC cameras etc.)

The stabilizing elements act as spacers during manufacturing of the adjustable lens element, which is necessary for the application of for example a defined amount/thickness of a liquid pre-polymer.

In an example of embodiment of the present invention, the flexible material (the polymer) has uniform thickness over the entire lens element as illustrated in FIGS. 2, 3 and 4, for example.

Figure 5:
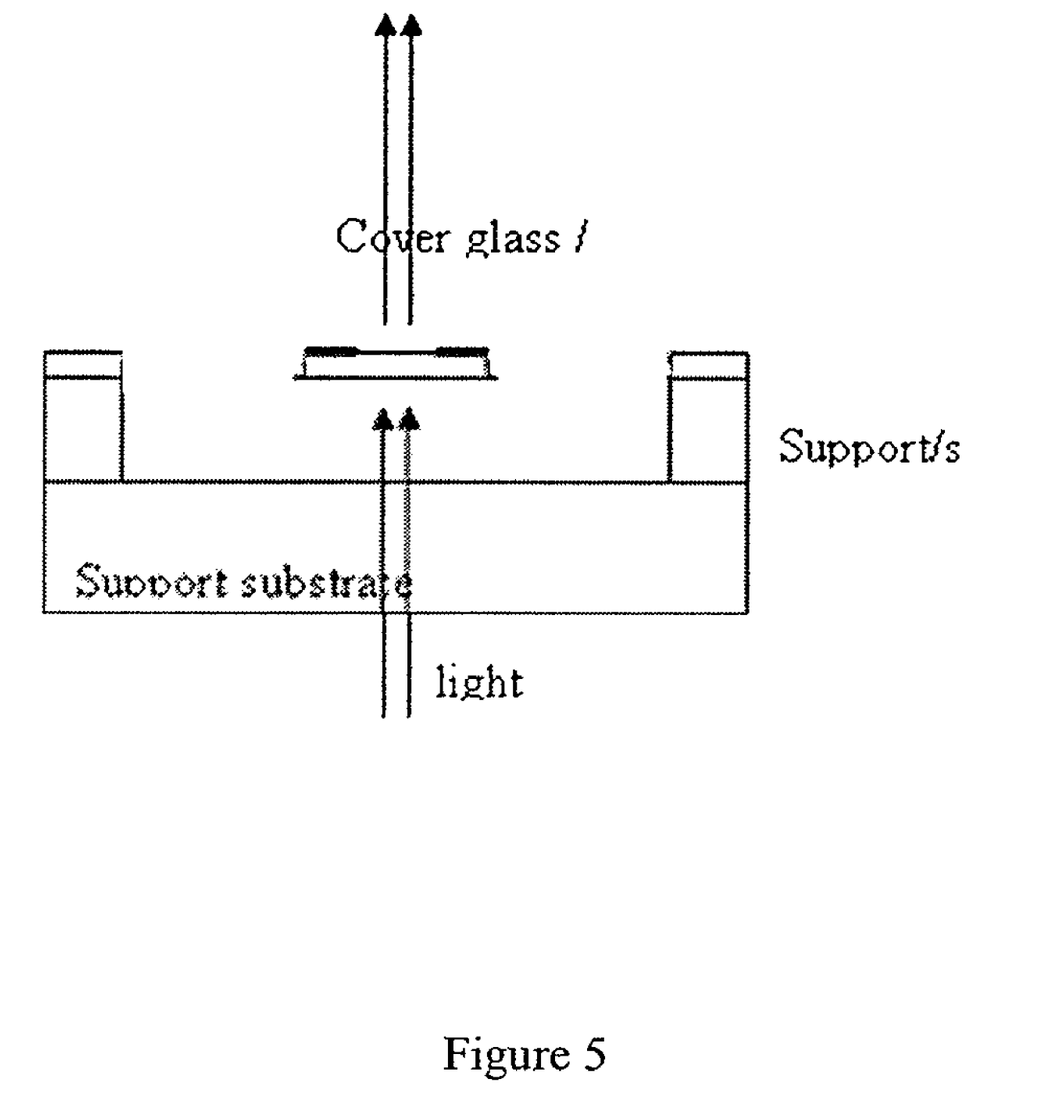
FIG. 5 illustrates another example of embodiment of the present invention.

In another example of embodiment of the present invention, the flexible material is shaped such that it has a lower thickness in the area between the actuator element and the stabilizing elements as depicted in FIG. 5.

In yet another example of embodiment of the present invention, the flexible material is removed from parts of the area between the actuator element and the stabilizing elements.

An important aspect of the present invention is to have support/spacing elements that are electrically conductive. This facilitates an effective routing of electrical signals, and in contacting the actuator element to an external voltage supply and control unit.

An optical system for a camera, mobile phone or laptop contains a lens stack with variable focus capability, a sensor array and electronics for amplification, conditioning and conversion of the optical signals. The interface to the focus part of the optical system is through the I/O device of the electronics. The electrical interface consists of two connectors supplying the control signal from the auto focus device of the electronics. If an adjustable lens element in a cost effective way shall be included on a wafer level assembly of a camera module, the introduction of it must not lead to an increase in the total lateral size of the camera module; thus, the location of the signal connectors from the auto focus algorithm is geometrically confined to within the total lateral dimensions of the image sensor.

According to another example of embodiment of the present invention, the transparent support is provided by glass on silicon, wherein an opening is arranged in the silicon to allow light to pass the lens assembly. In an example of embodiment of the present invention, electronics for driving the piezo electric element or a plurality of piezo electric elements, and control logic is integrated in the silicon part of the transparent assembly, or as a hybrid circuit bonded to the support. The signals are connected to the conductors in the spacer elements.

Figure 6:
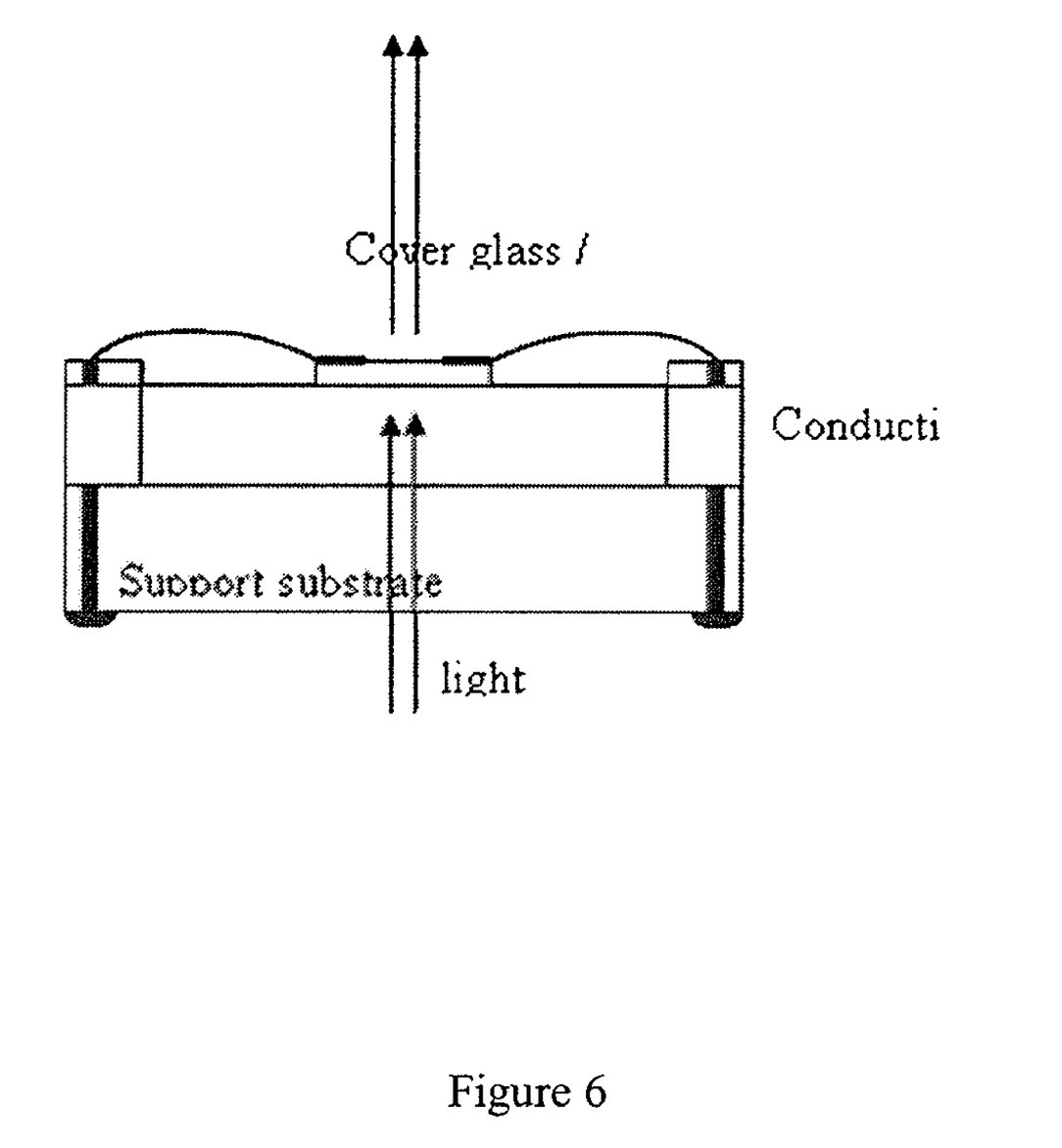
FIG. 6 illustrates yet another example of embodiment of the present invention.

In an example of embodiment of the present invention, through-holes in the cover glass is provided, or alternatively, removing of the cover glass above the support elements. Through holes can also be included in the bottom support substrate, as illustrated in FIG. 6. The key aspect of this embodiment is that electrical contacts to the actuator on the glass island top is provided by for example metal bonding on the bottom side of the lens element, which facilitates the implementation of the lens element in extremely compact optical stacks.

According to another example of embodiment of the present invention, the spacer members are embodied as a mechanically stable structures along the edges of the adjustable lens element, as a wall, that facilitates the possible horizontal inversion of the lens element, in other words having the deformable surface of the focus lens closest to the image sensor. This has the advantage of making electrical contact to the (piezo electrical) actuator easier to accomplish.

Figure 8:
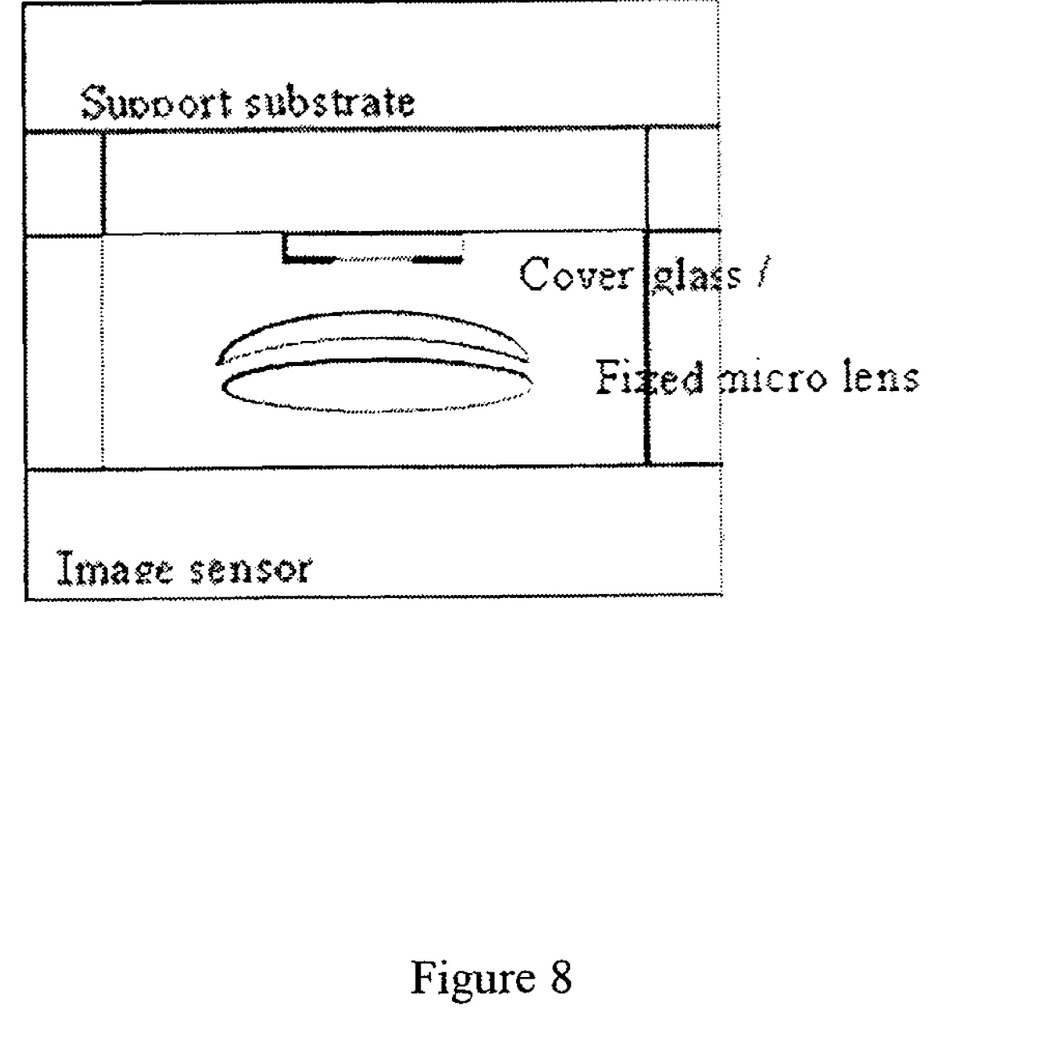
FIG. 8 illustrates an example of embodiment, in which the adjustable lens element is inverted horizontally.

Another example of embodiment of the invention is thus to invert the adjustable lens element, so that the side of the lens element on which the actuator is located is directly connected to the rest of the lens stack below it, as illustrated in FIG. 8.

Figure 7:
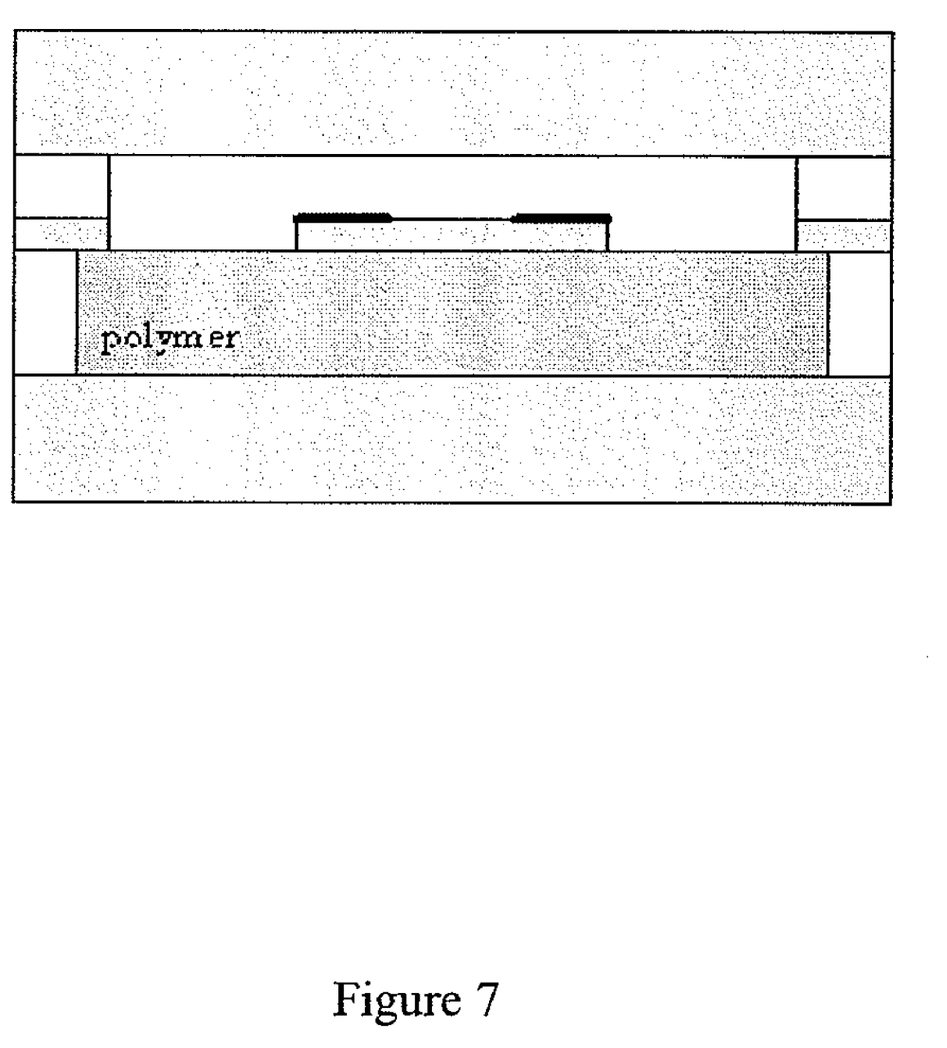
FIG. 7 illustrates disposal of protective cover.

According to yet another example of embodiment of the present invention, a protecting and mechanically stabilizing cover element (cover glass) that encapsulates the whole lens element is disposed as illustrated in FIG. 7.

According to yet another example of embodiment of the present invention, the piezo electric element bending the glass island is arranged as a plurality of independent actuator elements providing a possibility to achieve an asymmetric lens configuration by applying different voltages on the plurality of individual piezo electric elements, for example changing the line of sight without actually moving the lens assembly.

According to yet another example of embodiment of the present invention, the shape of the glass island comprising the piezo electric element can have any shape, not only circular, but any shape adapted to the use of the adjustable lens, for example for instrumentation purposes. By providing a specific shape of the glass island, a specific compression of the gel or elastomer is achievable, thereby providing a means of controlling lens parameters through the shaping of the deformations, as known to a person skilled in the art.

Further, the piezo electric element can be provided as one piece of element arranged in contact with the glass island on either side of the glass island, and in any pattern or shape of the piezo electric element. Such arrangement will provide different bending properties of the glass island, and hence different shaping of the deformation of the gel or elastomer, and hence change in optical parameters.

The invention claimed is:

1. An adjustable lens comprising: a transparent support substrate with a disposed gel or elastomer on a side of the support, wherein a thin glass cover is disposed on top of the gel or elastomer, wherein the thin glass cover is arranged with a circular shaped glass cut-out in the middle defining a glass island without any mechanical contact with the rest of the thin glass cover, wherein a piezo electric element is in contact with edges of the glass island, wherein at least one spacer member is arranged along one edge of the transparent support, wherein the at least one spacer member is supporting the thin glass cover, wherein through holes are arranged in the transparent support substrate and the glass cover on top of the gel or elastomer at locations adjacent to the respective top and bottom sides of the spacer members, thereby providing a possibility for contacting the spacer members throughout a stack of components in an optical assembly.

2. An adjustable lens comprising: a transparent support substrate with a disposed gel or elastomer on a side of the support, wherein a thin glass cover is disposed on top of the gel or elastomer, wherein the thin glass cover is arranged with a circular shaped glass cut-out in the middle defining a glass island without any mechanical contact with the rest of the thin glass cover, wherein a piezo electric element is in contact with edges of the glass island, wherein the transparent support is provided by glass on silicon substrate, wherein an opening is arranged in the silicon substrate letting light pass through the adjustable lens.

3. An adjustable lens comprising: a transparent support substrate with a disposed gel or elastomer on a side of the support, wherein a thin glass cover is disposed on top of the gel or elastomer, wherein the thin glass cover is arranged with a circular shaped glass cut-out in the middle defining a glass island without any mechanical contact with the rest of the thin glass cover, wherein a piezo electric element is in contact with edges of the glass island, wherein the transparent support is provided by glass on silicon substrate, wherein an opening is arranged in the silicon substrate letting light pass through the adjustable lens, wherein the silicon substrate comprise electronic components related to the piezo electric element or piezo electric elements in the adjustable lens.

4. An adjustable lens comprising: a transparent support substrate with a disposed gel or elastomer on a side of the support, wherein a thin glass cover is disposed on top of the gel or elastomer, wherein the thin glass cover is arranged with a circular shaped glass cut-out in the middle defining a glass island without any mechanical contact with the rest of the thin glass cover, wherein a piezo electric element is in contact with edges of the glass island, wherein the transparent support is provided by glass on silicon substrate, wherein an opening is arranged in the silicon substrate letting light pass through the adjustable lens. wherein the silicon substrate comprise electronic components related to the piezo electric element or piezo electric elements in the adjustable lens, wherein the electronic components are provided as separate circuits supported by the silicon substrate of the transparent support.

5. An adjustable lens comprising: a transparent support substrate with a disposed gel or elastomer on a side of the support, wherein a thin glass cover is disposed on top of the gel or elastomer, wherein the thin glass cover is arranged with a circular shaped glass cut-out in the middle defining a glass island without any mechanical contact with the rest of the thin glass cover, wherein a piezo electric element is in contact with edges of the glass island, wherein an image sensor is arranged as an integral part of the adjustable lens by arranging the at least one spacer member to support components of the adjustable lens such that the gel or elastomer is disposed on the one side of the transparent support with the glass island floating on top of the gel or elastomer, wherein the at least one spacer member provides a space in the lens assembly for attaching the image sensor on to the at least one spacer member at an end of the at least one spacer member opposite the side of the transparent support.

6. An adjustable lens comprising: a transparent support substrate with a disposed gel or elastomer on a side of the support, wherein a thin glass cover is disposed on top of the gel or elastomer, wherein the thin glass cover is arranged with a circular shaped glass cut-out in the middle defining a glass island without any mechanical contact with the rest of the thin glass cover, wherein a piezo electric element is in contact with edges of the glass island, wherein an image sensor is arranged as an integral part of the adjustable lens by arranging the at least one spacer member to support components of the adjustable lens such that the gel or elastomer is disposed on the one side of the transparent support with the glass island floating on top of the gel or elastomer, wherein the at least one spacer member provides a space in the lens assembly for attaching the image sensor on to the at least one spacer member at an end of the at least one spacer member opposite the side of the transparent support, wherein a fixed micro lens is arranged in the space provided by the at least one spacer member for attaching the image sensor.

* * * * *

UNITED STATES PATENT AND TRADEMARK OFFICE
CERTIFICATE OF CORRECTION

| | | |
|---|---|---|
| PATENT NO. | : 8,045,280 B2 | Page 1 of 1 |
| APPLICATION NO. | : 12/445272 | |
| DATED | : October 25, 2011 | |
| INVENTOR(S) | : Lars Henriksen et al. | |

It is certified that error appears in the above-identified patent and that said Letters Patent is hereby corrected as shown below:

Title Page, (Item 54) and at Column 1, Line 1, Title, please delete "COMPACT" and insert therefore -- DESIGN OF COMPACT --.

At Column 3, Line 3, please delete "system" and insert therefore -- system. --.

At Column 6, Line 25, please delete "lens." and insert therefore -- lens, --.

Signed and Sealed this
Eighteenth Day of December, 2012

David J. Kappos
*Director of the United States Patent and Trademark Office*